United States Patent
Kang

(10) Patent No.: US 7,156,587 B2
(45) Date of Patent: Jan. 2, 2007

(54) REINFORCING GEOTEXTILE MAT AND EMBANKMENT METHOD USING THE SAME

(76) Inventor: Soo Yong Kang, 13-1201, New Town Apt., Bisan 3-dong, 341, Dongan-gu, Anyang-si, Gyeonggi-do (KR)

( * ) Notice: Subject to any disclaimer, the term of this patent is extended or adjusted under 35 U.S.C. 154(b) by 0 days.

(21) Appl. No.: 11/134,209

(22) Filed: May 19, 2005

(65) Prior Publication Data

US 2005/0260042 A1    Nov. 24, 2005

(30) Foreign Application Priority Data

May 20, 2004    (KR)    ..................... 10-2004-0035996

(51) Int. Cl.
*E02D 17/18* (2006.01)
(52) U.S. Cl. ................. 405/302.6; 405/302.7
(58) Field of Classification Search ............. 405/302.4, 405/302.6, 302.7, 262, 284, 15–19, 21, 32, 405/107, 115
See application file for complete search history.

(56) References Cited

U.S. PATENT DOCUMENTS

| | | | | |
|---|---|---|---|---|
| RE33,550 E | * | 3/1991 | Jones | ............................. 404/7 |
| 5,161,917 A | | 11/1992 | Papetti | ........................ 405/284 |
| 5,971,661 A | * | 10/1999 | Johnson et al. | ............. 405/114 |
| 6,357,970 B1 | | 3/2002 | Hilfiker et al. | .......... 405/302.7 |

FOREIGN PATENT DOCUMENTS

| | | | |
|---|---|---|---|
| JP | 3-51424 | * | 3/1991 |
| JP | 3-233021 | * | 10/1991 |
| KR | 100419883 | | 10/2004 |

* cited by examiner

*Primary Examiner*—Sunil Singh
(74) *Attorney, Agent, or Firm*—Abelman, Frayne & Schwab

(57) ABSTRACT

A reinforcing geotextile mat and an embankment method using the same. The mat comprises support member for supporting backfilled soil at one end or both ends of the mat. The support member comprises a horizontal support section for supporting the backfilled soil in a vertical direction; a vertical support section for supporting the backfilled soil in a horizontal direction; and an inclined support section defined with openings through which the backfilling soil passes and inclinedly embedded in the backfilled soil. The method comprises the steps of positioning a reinforcing geotextile mat on the ground or hardened embankment soil; inserting external support members in horizontal, vertical and inclined receiving portions of the mat; and backfilling horizontal, vertical and inclined support sections of the mat with soil, and then placing and hardening embankment soil on the mat. These steps are implemented one or more times.

4 Claims, 11 Drawing Sheets

REINFORCING GEOTEXTILE MAT AND EMBANKMENT METHOD USING THE SAME

BACKGROUND OF THE INVENTION

1. Field of the Invention

The present invention relates, in general, to a reinforcing geotextile mat and an embankment method using the same, and more particularly, to a reinforcing geotextile mat which is manufactured by assembling support members in a geotextile mat to serve as a retaining wall and an embankment method which uses the reinforcing geotextile mat to reduce the construction cost and shorten the construction period.

2. Description of the Prior Art

Due to environmental or economic issues, it is frequently required to form a steeply inclined natural or artificial slope. In such a situation, in order to secure structural and dynamic stability of the slope, multiple layers of geotextile are used while constructing the slope.

In addition to the case of forming a steeply inclined slope, geotextile is used in the case of restoring a broken slope with the aim of reinforcing the ground.

In addition, geotextile is used to reinforce areas upstream and downstream from a dam and increase the height of the dam, construct a temporary flood control structure, reinforce an abutment of a bridge and decrease the span of the bridge, construct a temporary bypass road, and construct a levee using water-containing fine particles.

An example of a conventional construction method using the geotextile is disclosed in Korean Patent No. 10-419883 entitled "Slope plantation earth reinforcement method", which will be described with reference to FIGS. 8a through 8i.

The conventional slope plantation earth reinforcement method is implemented as described below.

As shown in FIG. 8A, after the in-situ ground is hardened, a plurality of steel bars 10 are laid out on the in-situ ground.

Next, as shown in FIG. 8B, support tubes 36 of a form board 30 are inserted around ends of the steel bars 10 to fix the form board 30 at a predetermined position.

Then, as shown in FIG. 8C, a vegetation mat 40 and a lapping textile 42 are installed on the in-situ ground and the form board 30, and then a first embankment layer 52 having a predetermined height is formed and hardened on the in-situ ground.

Thereafter, as shown in FIG. 8D, a step-shaped embankment wall 54 is formed on the first embankment layer 52.

Successively, as shown in FIG. 8E, the first embankment layer 52 and the embankment wall 54 are lapped using a lapping textile 42.

Next, as shown in FIG. 8F, a second embankment layer 56 is formed on the first embankment layer 52 to have the same height as a support section 32.

Then, as shown in FIG. 8G, by moving the form board 30 forward by a predetermined distance and fixing the form board 30 to steel bars 10, Then, as shown in FIG. 8H, a predetermined space 57 is defined in front of the embankment layers 52 and 56, and a vegetation soil layer 58 is formed in the space 57.

Finally, as shown in FIG. 8I, the upper part of the vegetation soil layer 58 is covered by a vegetation mat 40, and ends of the vegetation mat 40 are appropriately fixed.

However, the conventional earth reinforcement method has a drawback in that, since the form board must be repeatedly installed and uninstalled in order to form the embankment layers, the construction cost increases and the construction period is lengthened.

Further, because an embankment layer may only be formed after a previous embankment layer is completely hardened, the construction period is further lengthened.

Meanwhile, U.S. Pat. No. 5,161,917 discloses a method of and an element for the production of structures for containing areas of ground. In this publication, an element for use in producing stabilized soil structures comprises a sheet of double-twisted galvanized and plastic-coated metal mesh which has on one end a box portion made from panel of the sheet panels and folded up from the end of the sheet and an additional transverse panel fixed to the sheet. In use, a plurality of elements are superposed with the box portions providing the anterior wall of the structure and the remainder of each sheet extending back into the structure to stabilize the structure. Each element is filled and covered with fill material before a succeeding element is positioned on it. The fold lines of panels are defined by strips introduced into the mesh of sheet during manufacture.

This conventional technique suffers from defects in that, since the box portions must be folded and installed in situ, workability is degraded, and since specific holding means is not provided, it is difficult to handle the element.

Also, U.S. Pat. No. 6,357,970 discloses an improved method and apparatus for constructing a soil reinforced earthen retaining wall. In this publication, successive soil reinforcing mats embedded within an earthen formation have bent-up face elements which are slidably engaged to enable the earthen formation to settle without bulging the face elements. Backing mats are disposed behind the face elements for movement relative thereto in generally vertical planes. The backing mats serve to support the successive soil reinforcing mats and permit the mats to move toward one another to accommodate settling of the formation without bulging of the face elements.

However, this technique still encounters the same problems as described above in connection with the conventional arts.

SUMMARY OF THE INVENTION

Accordingly, the present invention has been made keeping in mind the above problems occurring in the prior art, and an object of the present invention is to provide a reinforcing geotextile mat which has support members capable of supporting an embankment layer.

Another object of the present invention is to provide an embankment method which uses a reinforcing geotextile mat to reduce a construction cost and shorten a construction period.

In order to achieve the first object, according to one aspect of the present invention, there is provided a reinforcing geotextile mat comprising support means arranged at both ends of the reinforcing geotextile mat, to support a predetermined amount of embankment soil, with a portion of each support means embedded in backfilled soil.

According to another aspect of the present invention, there is provided a reinforcing geotextile mat comprising support means arranged at one end of the reinforcing geotextile mat, to support a predetermined amount of embankment soil, with a portion of the support means embedded in backfilled soil; and an accommodating section arranged at the other end of the reinforcing geotextile mat, to accommodate an element to be fixedly held, with the entire accommodating section embedded in the embankment soil.

According to another aspect of the present invention, the support means comprises a horizontal support section for supporting the backfilled soil in a vertical direction; a vertical support section for supporting the backfilled soil in a horizontal direction; and an inclined support section defined with openings through which the backfilling soil passes and inclinedly embedded in the backfilled soil.

According to another aspect of the present invention, when assuming that lengths of the horizontal support section, the vertical support section and the inclined support section are respectively $L_{H1}$, $L_{V1}$ and $L_{C1}$, $L_{H1}=3.5\sim4.5*L_{V1}$ and $L_{C1}=3.9\sim5.0*L_{V1}$.

According to another aspect of the present invention, the horizontal support section, the vertical support section and the inclined support section have a horizontal receiving portion, a vertical receiving portion and an inclined receiving portion, respectively, into which external support members for increasing supporting force are inserted.

According to another aspect of the present invention, when assuming that lengths of the horizontal receiving portion, the vertical receiving portion and the inclined receiving portion are respectively $L_{H2}$, $L_{V2}$ and $L_{C2}$, $L_{H2}=0.6\sim1.0*L_{V2}$ and $L_{C2}=0.2\sim0.5*L_{V2}$.

In order to achieve the second object, according to another aspect of the present invention, there is provided an embankment method using a reinforcing geotextile mat, comprising (a) step for positioning the reinforcing geotextile mat on the ground or hardened embankment soil in a deployed state; (b) step for inserting external support members in a horizontal receiving portion, a vertical receiving portion and an inclined receiving portion of the reinforcing geotextile mat; and (c) step for backfilling a horizontal support section, a vertical support section and an inclined support section of the reinforcing geotextile mat with soil, and then placing and hardening embankment soil on the reinforcing geotextile mat so that the embankment soil has a predetermined height, wherein steps (a), (b) and (c) are implemented one or more times.

According to still another aspect of the present invention, step (b) comprises the step of inserting the external support members through the receiving portions of a plurality of reinforcing geotextile mats to laterally couple the plurality of reinforcing geotextile mats to one another.

According to yet still another aspect of the present invention, step (c) comprises the step of installing a drainpipe defined with a plurality of through-holes, adjacent to the support sections of the reinforcing geotextile mat.

BRIEF DESCRIPTION OF THE DRAWINGS

The above and other objects, features and other advantages of the present invention will be more clearly understood from the following detailed description when taken in conjunction with the accompanying drawings, in which.

DETAILED DESCRIPTION OF THE INVENTION

Figure 1:
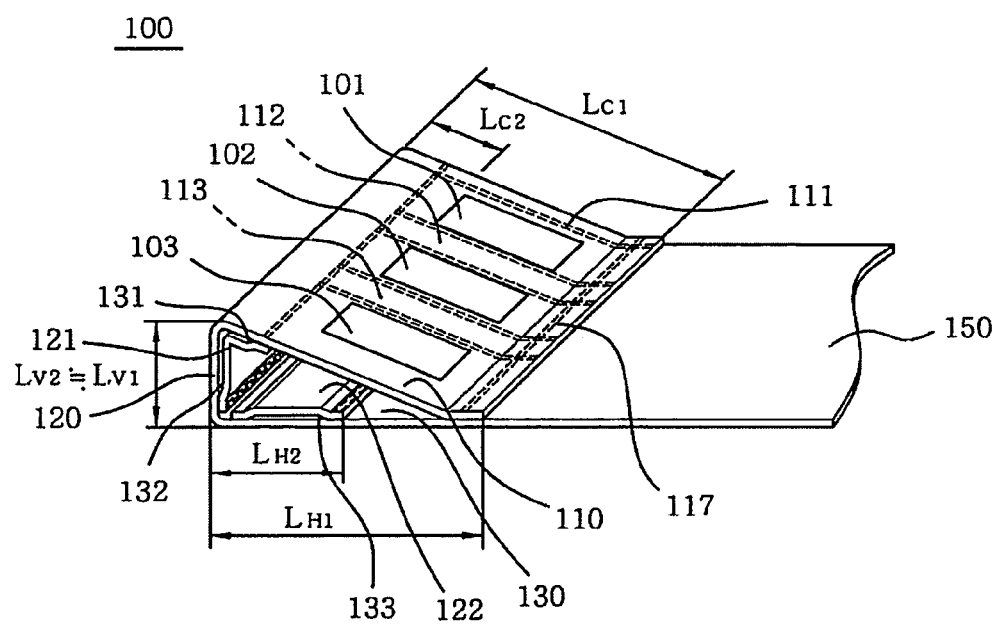
FIG. 1 is a schematic perspective view illustrating a reinforcing geotextile mat in accordance with a first preferred embodiment of the present invention.

Reference will now be made in greater detail to preferred embodiments of the invention, examples of which are illustrated in the accompanying drawings. Wherever possible, the same reference numerals will be used throughout the drawings and the description to refer to the same or like parts.

First, reinforcing geotextile mats in accordance with preferred embodiments of the present invention will be described with reference to FIGS. 1 through 4C.

First Embodiment

A reinforcing geotextile mat in accordance with a first preferred embodiment of the present invention will be described with reference to FIGS. 1 through 2C.

As shown in FIG. 1, a reinforced geotextile mat 100 has at both ends thereof support means each of which serves as a retaining wall for supporting embankment soil.

The support means is composed of an inclined support section 110, a vertical support section 120 and a horizontal support section 130.

The inclined support section 110 is a section to be embedded and fixedly maintained in the embankment soil. The inclined support section 110 is formed with a first opening 101, a second opening 102 and a third opening 103.

While, in this embodiment of the present invention, the openings 101, 102 and 103 are defined to have a rectangular shape, the shape and number of the openings are not specifically limited so long as backfilling soil can easily pass through the openings.

The inclined support section 110 has a first stitched portion 111, a second stitched portion 112 and a third stitched portion 113 which are formed by turning over or superposing and stitching one or more cut portions of the reinforcing geotextile mat 100.

In this way, by turning over or superposing one or more cut portions at one side or both sides of each of the openings 101, 102 and 103 and then forming the stitched portions 111, 112 and 113, the tensile strength of the inclined support section 110 is increased.

The vertical support section 120 is a section to support backfilled soil in a horizontal direction, and has a first superposed portion 121 which is partially connected to the inclined support section 110.

A vertical receiving portion 132 into which a first external support member (not shown) is inserted is formed between the vertical support section 120 and the first superposed portion 121, and an inclined receiving portion 131 into which the first external support member (not shown) is inserted is formed between the inclined support section 110 and the first superposed portion 121.

While, in this embodiment, the inclined receiving portion 131 and the vertical receiving portion 132 are formed to communicate with each other, it is to be readily understood that they may be formed to be partitioned from each other.

The horizontal support section 130 is a section to support the backfilled soil in a vertical direction, and is connected at one end thereof to the vertical support section 120 and at the other end thereof to a base 150 of the reinforcing geotextile mat 100.

The horizontal support section 130 has a second superposed portion 122.

A horizontal receiving portion 133 into which a second external support member (not shown) is inserted is formed between the horizontal support section 130 and the second superposed portion 122.

When assuming that lengths of the inclined support section 110, the vertical support section 120 and the horizontal support section 130 are respectively $L_{H1}$, $L_{V1}$ and $L_{C1}$, lengths of the inclined receiving portion 131, the vertical receiving portion 132 and the horizontal receiving portion 133 are respectively $L_{H2}$, $L_{V2}$ and $L_{C2}$, and $L_{V1} \cong L_{V2} = L$, it is preferred from structural and dynamic points of view that the lengths satisfy the following equations 1.

$$L_{C1} = 3.9 \sim 5.0 * L$$

$$L_{H1} = 3.5 \sim 4.5 * L$$

$$L_{C2} = 0.2 \sim 0.5 * L$$

$$L_{H2} = 0.6 \sim 1.0 * L \quad \text{[Equations 1]}$$

Figure 2A:
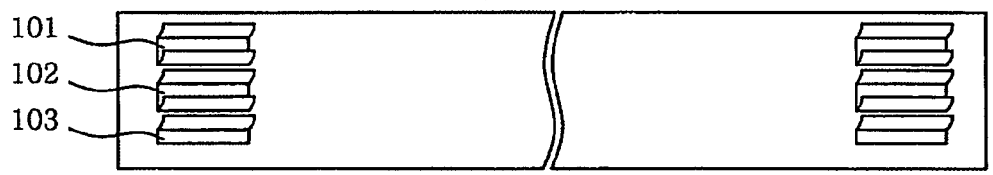
FIGS. 2A through 2C are schematic views illustrating a procedure for manufacturing the reinforcing geotextile mat shown in FIG. 1.
Figure 2B:
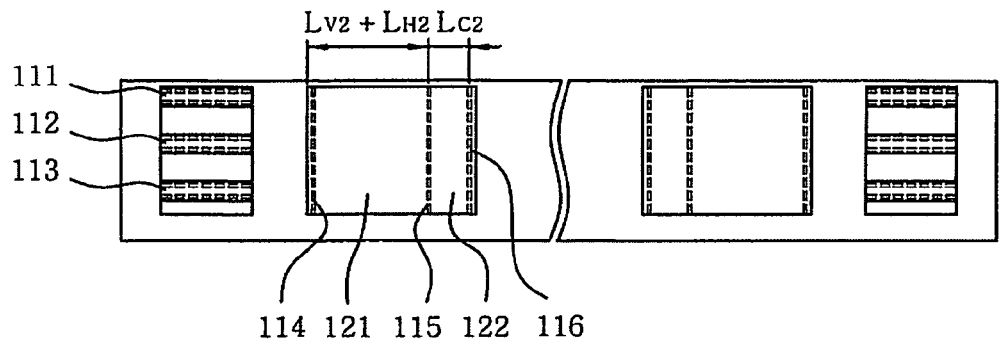
Figure 2C:
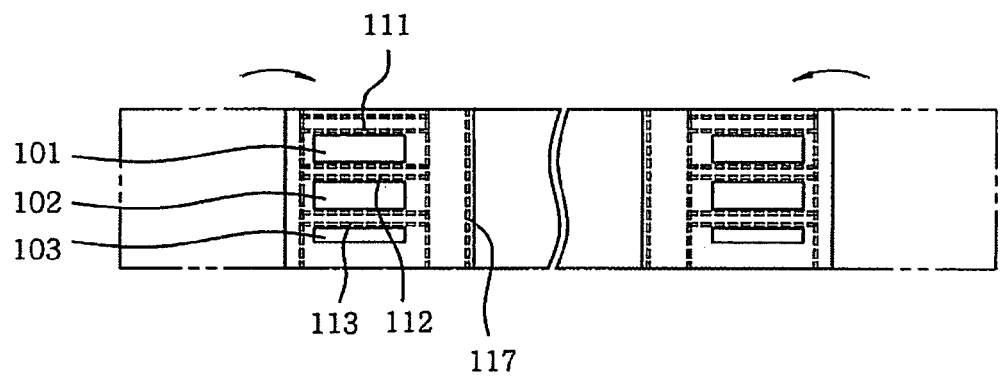

The above-described reinforcing geotextile mat 100 is manufactured as shown in FIGS. 2A through 2C.

First, as shown in FIG. 2A, on each end of the reinforcing geotextile mat 100, the first opening 101, the second opening 102 and the third opening 103 are defined by cutting portions of the reinforcing geotextile mat 100 to have a predetermined interval and a predetermined length.

Next, as shown in FIG. 2B, in order to form the openings 101, 102 and 103, one or more cut portions are turned over or superposed and then stitched to the reinforcing geotextile mat 100 to form the first stitched portion 111, the second stitched portion 112 and the third stitched portion 113.

Further, a piece of preselected material, preferably, a piece of geotextile, is superposed on the reinforcing geotextile mat 100 adjacent to the openings 101, 102 and 103 and then stitched to the reinforcing geotextile mat 100 to form the first superposed portion 121, the second superposed portion 122, a fourth stitched portion 114, a fifth stitched portion 115 and a sixth stitched portion 116.

At this time, it is preferred that the length of the first superposed portion 121 be set to be slightly greater than the sum of the lengths of the inclined receiving portion 131 and the vertical receiving portion 132, and the length of the second superposed portion 122 be set to be slightly greater than the length of the horizontal receiving portion 133.

Finally, as shown in FIG. 2C, a portion of the reinforcing geotextile mat 100, which is to be formed as the inclined support section 110 having the openings 101, 102 and 103, is folded in the direction indicated by the arrow, and the distal end of the folded portion is stitched to the reinforcing geotextile mat 100 to form a seventh stitched portion 117.

Second Embodiment

A reinforcing geotextile mat in accordance with a second preferred embodiment of the present invention will be described with reference to FIGS. 3 through 4C.

Figure 3:
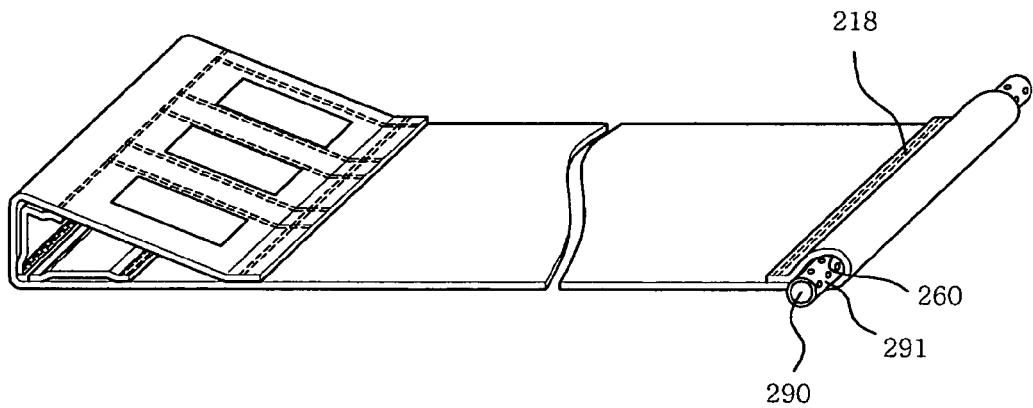
FIG. 3 is a schematic perspective view illustrating a reinforcing geotextile mat in accordance with a second preferred embodiment of the present invention.

As shown in FIG. 3, a reinforcing geotextile mat 200 has support means which is arranged at one end of the reinforcing geotextile mat 200 and serves as a retaining wall for supporting embankment soil, and an accommodating section 260 which is arranged at the other end of the reinforcing geotextile mat 200 and is embedded in the embankment soil to accommodate an element to be fixed and thereby fixedly hold the reinforcing geotextile mat 200 with respect to the embankment soil.

Since the support means is constructed in the same manner as in the first embodiment, detailed description thereof will be omitted herein.

The accommodating section 260 is defined by forming an eighth stitched portion 118 through folding the other end of the reinforcing geotextile mat 200 and stitching the folded end to the reinforcing geotextile mat 200.

While it is preferred that the accommodating section 260 be embedded in the embankment soil in a state in which a drainpipe 290 having a predetermined length is accommodated in the accommodating section 260, the accommodating section 260 can be embedded in the embankment soil without using the drainpipe 290.

The drainpipe 290 not only serves to fixedly hold the reinforcing geotextile mat 200 in the embankment soil, but also is formed with a plurality of through-holes 291 to drain water contained in the embankment soil to the outside.

Figure 4A:
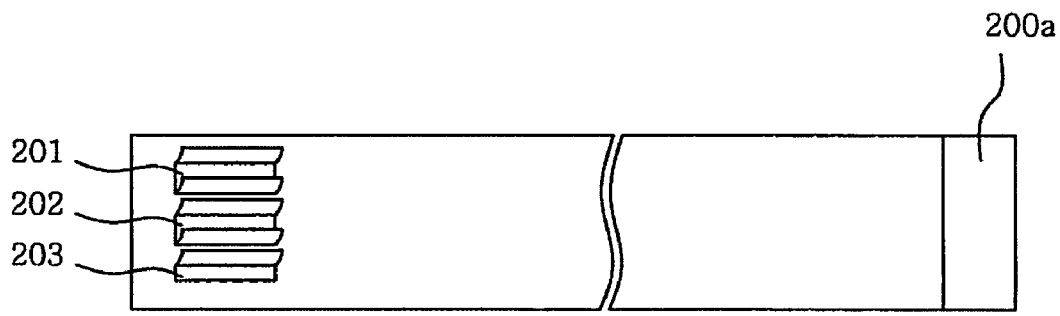
FIGS. 4A through 4C are schematic views illustrating a procedure for manufacturing the reinforcing geotextile mat shown in FIG. 3.
Figure 4B:
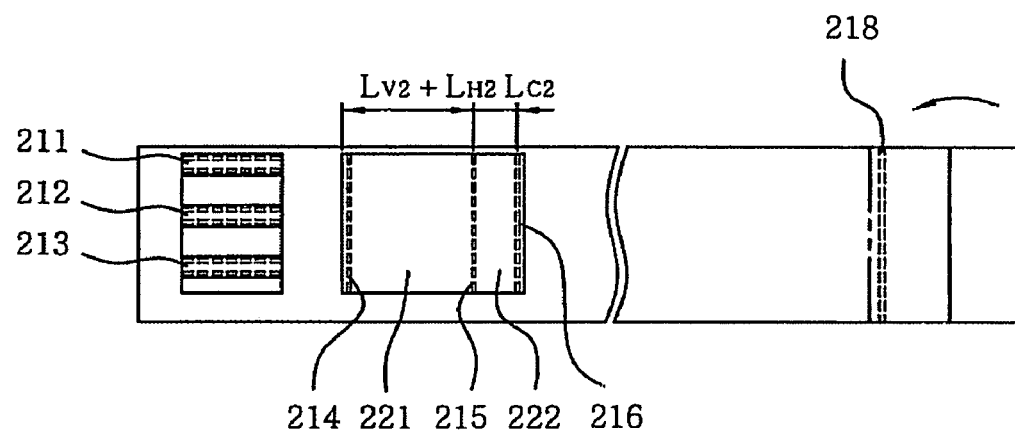
Figure 4C:
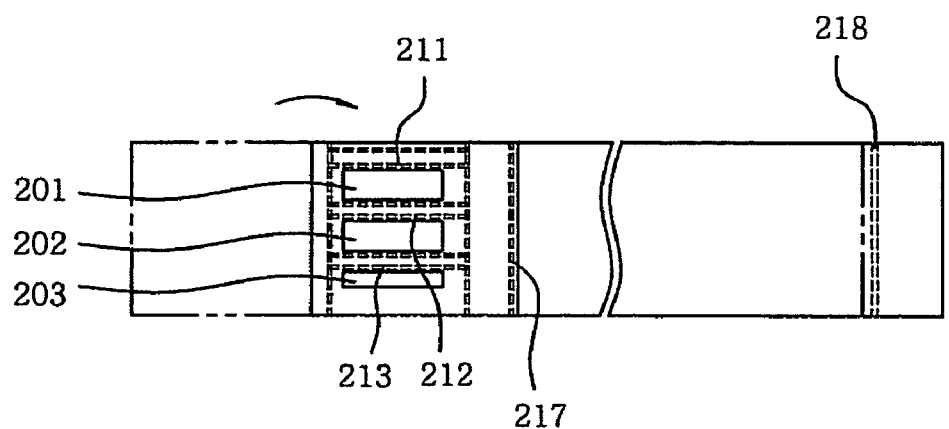

The above-described reinforcing geotextile mat 200 is manufactured as shown in FIGS. 4A through 4C.

First, as shown in FIG. 4A, on one end of the reinforcing geotextile mat 200, a first opening 201, a second opening 202 and a third opening 203 are defined by cutting portions of the reinforcing geotextile mat 200 to have a predetermined interval and a predetermined length, and from the other end of the reinforcing geotextile mat 200, a folding portion 200a having a predetermined length is established.

Next, as shown in FIG. 4B, in order to form the openings 201, 202 and 203, one or more cut portions are turned over or superposed and then stitched to the reinforcing geotextile mat 200 to form a first stitched portion 211, a second stitched portion 212 and a third stitched portion 213.

Further, a piece of preselected material, preferably, a piece of geotextile, is superposed on the reinforcing geotextile mat 200 adjacent to the openings 201, 202 and 203 and then stitched to the reinforcing geotextile mat 200 to form a first superposed portion 221, a second superposed portion 222, a fourth stitched portion 214, a fifth stitched portion 215 and a sixth stitched portion 216. And, the folding portion 200a is folded and stitched to the reinforcing geotextile mat 200 to form an eighth stitched portion 218.

At this time, it is preferred that the length of the first superposed portion 221 be set to be slightly greater than the sum of the lengths of an inclined receiving portion 231 and a vertical receiving portion 232, and the length of the second superposed portion 222 be set to be slightly greater than the length of a horizontal receiving portion 233.

Finally, as shown in FIG. 4C, a portion of the reinforcing geotextile mat 200, which is to be formed as an inclined support section 210 having the openings 201, 202 and 203, is folded in the direction indicated by the arrow, and the distal end of the folded portion is stitched to the reinforcing geotextile mat 200 to form a seventh stitched portion 217.

Next, embankment methods in accordance with preferred embodiments of the present invention will be described with reference to FIGS. 5A through 6E.

Third Embodiment

An embankment method in accordance with a third preferred embodiment of the present invention which uses the reinforcing geotextile mat shown in FIG. 1 will be described with reference to FIGS. 5A through 5E.

Figure 5A:
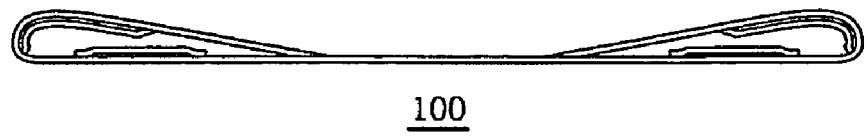
FIGS. 5A through 5E are schematic views illustrating an embankment method in accordance with a third preferred embodiment of the present invention, which uses the reinforcing geotextile mat shown in FIG. 1.

First, as shown in FIG. 5A, the reinforcing geotextile mat 100 is positioned on the ground in a deployed state.

Figure 5B:
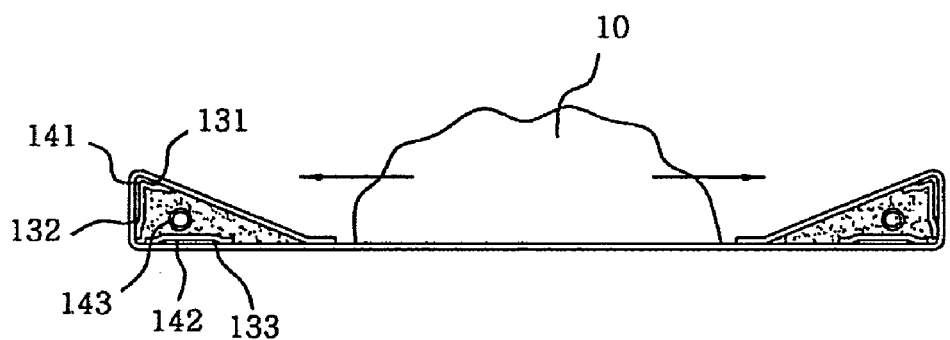

Next, as shown in FIG. 5B, by inserting the first external support member 141 into the inclined receiving portion 131 and the vertical receiving portion 132 and inserting the second external support member 142 into the horizontal receiving portion 133, the retaining wall for supporting the backfilled soil is formed. At this time, the embankment soil 10 is placed on the reinforcing geotextile mat 100. In the case that a drainage system is required, depending upon the circumstances at an embankment installation spot, a drainpipe 143 may be installed at a predetermined location.

Figure 5C:
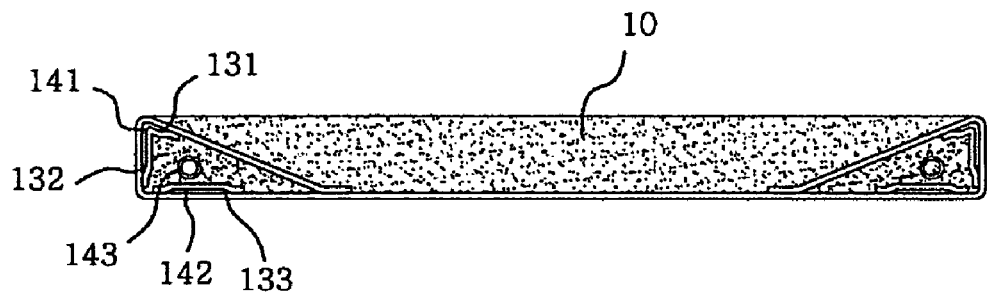

Then, as shown in FIG. 5C, after implementing backfilling work by evenly distributing the embankment soil 10, the embankment soil 10 is hardened to have a predetermined height.

Figure 5D:
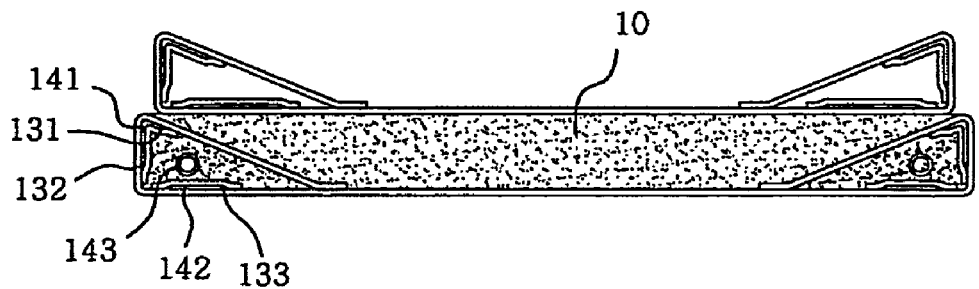

Thereupon, as shown in FIG. 5D, after a new reinforcing geotextile mat 100 is deployed on the embankment soil hardened in this way, the above-described procedure is repeated. In this regard, it is preferred that the size of the new mat installed on the hardened embankment soil be less than that of the previously installed mat.

Figure 5E:
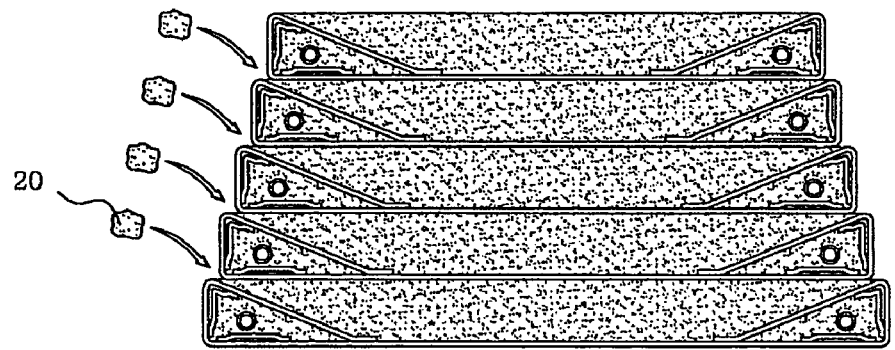

Finally, as shown in FIG. 5E, green soil 20 is provided to each stepped portion which is formed between two layers of embankment soil.

Fourth Embodiment

An embankment method in accordance with a fourth preferred embodiment of the present invention which uses the reinforcing geotextile mat shown in FIG. 3 will be described with reference to FIGS. 6A through 6E.

Figure 6A:
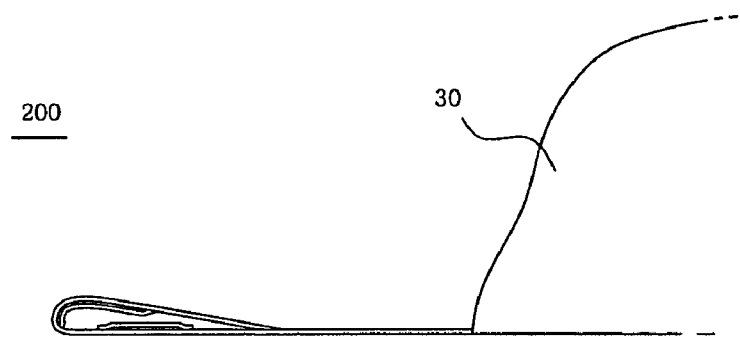
FIGS. 6A through 6E are schematic views illustrating an embankment method in accordance with a fourth preferred embodiment of the present invention, which uses the reinforcing geotextile mat shown in FIG. 3.

First, as shown in FIG. 6A, the reinforcing geotextile mat 200 is positioned in a deployed state on the ground being adjacent to a slope 30.

Figure 6B:
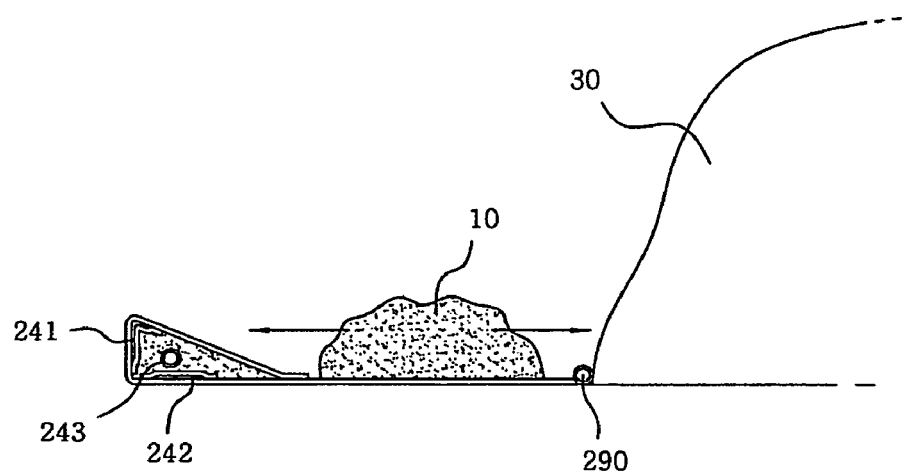

Next, as shown in FIG. 6B, by inserting a first external support member 241 into the inclined receiving portion 231 and the vertical receiving portion 232 and inserting a second external support member 242 into the horizontal receiving portion 233, the retaining wall for supporting the backfilled soil is formed. At this time, the embankment soil 10 is placed on the reinforcing geotextile mat 200. In the case that a drainage system is required, depending upon the circumstances at an embankment installation spot, a drainpipe 243 may be installed at a predetermined location.

Figure 6C:
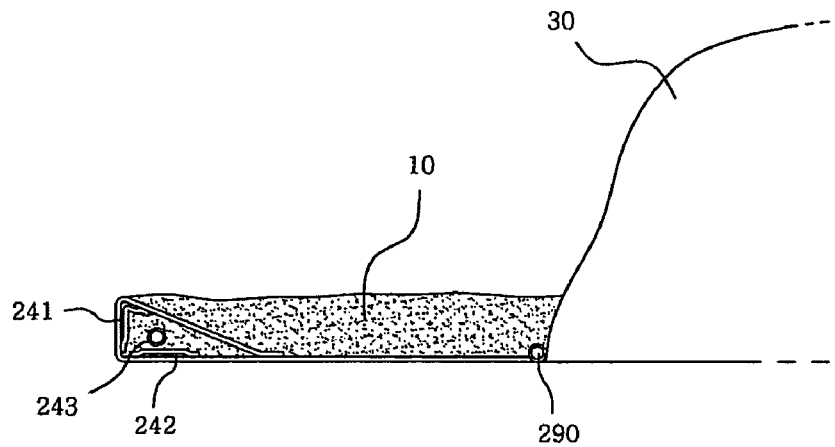

Then, as shown in FIG. 6C, after implementing backfilling work by evenly distributing the embankment soil 10, the embankment soil 10 is hardened to have a predetermined height.

Figure 6D:
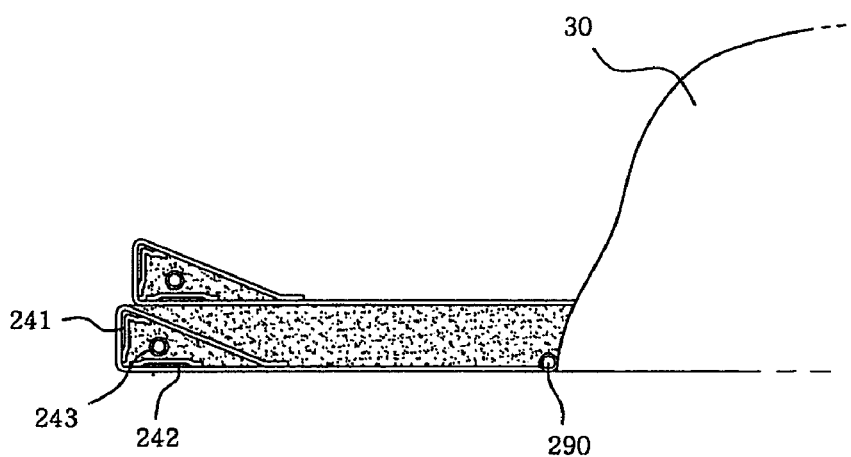

Thereupon, as shown in FIG. 6D, after a new reinforcing geotextile mat 200 is deployed on the embankment soil hardened in this way, the above-described procedure is repeated. In this regard, it is preferred that the size of the new mat installed on the hardened embankment soil be less than that of the previously installed mat.

Figure 6E:
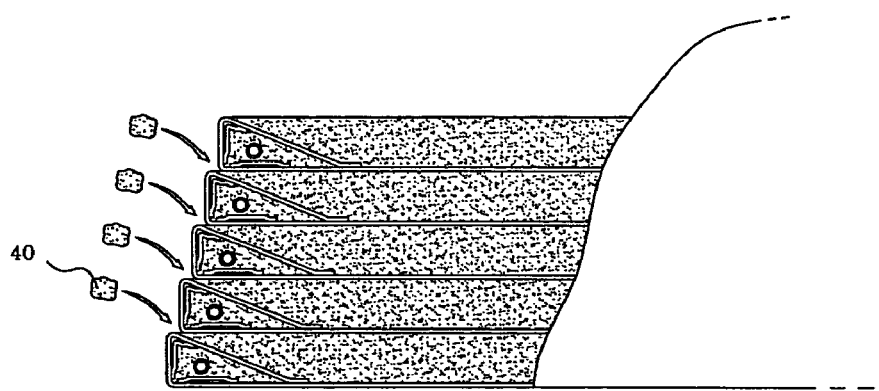

Finally, as shown in FIG. 6E, green soil 40 is provided to each stepped portion formed between two layers of embankment soil.

Figure 7:
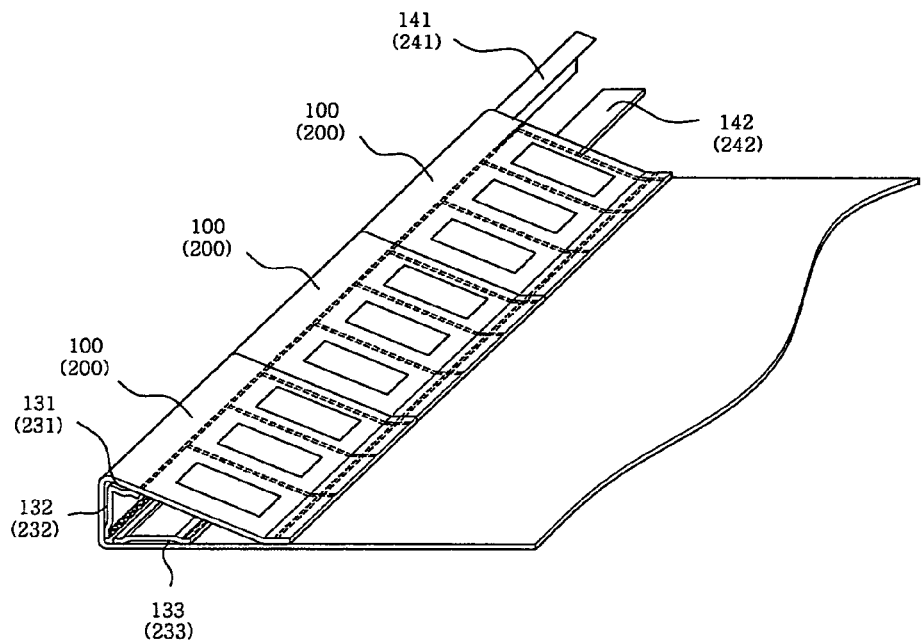
FIG. 7 is a schematic view illustrating a state in which a plurality of reinforcing geotextile mats shown in FIGS. 1 and 3 are coupled to one another.
Figure 8A:
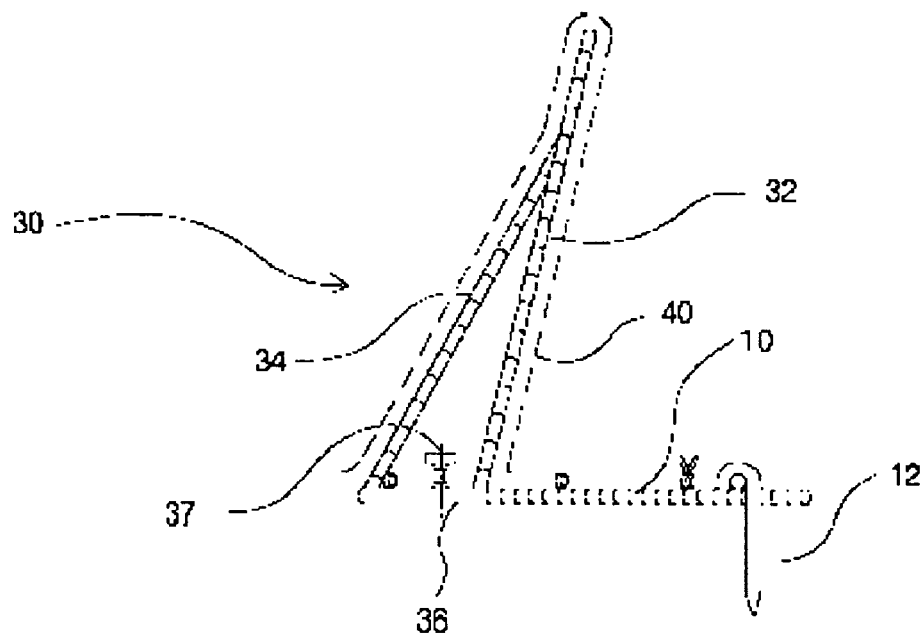
FIGS. 8A through 8I are schematic views illustrating a conventional earth reinforcement method.
Figure 8B:
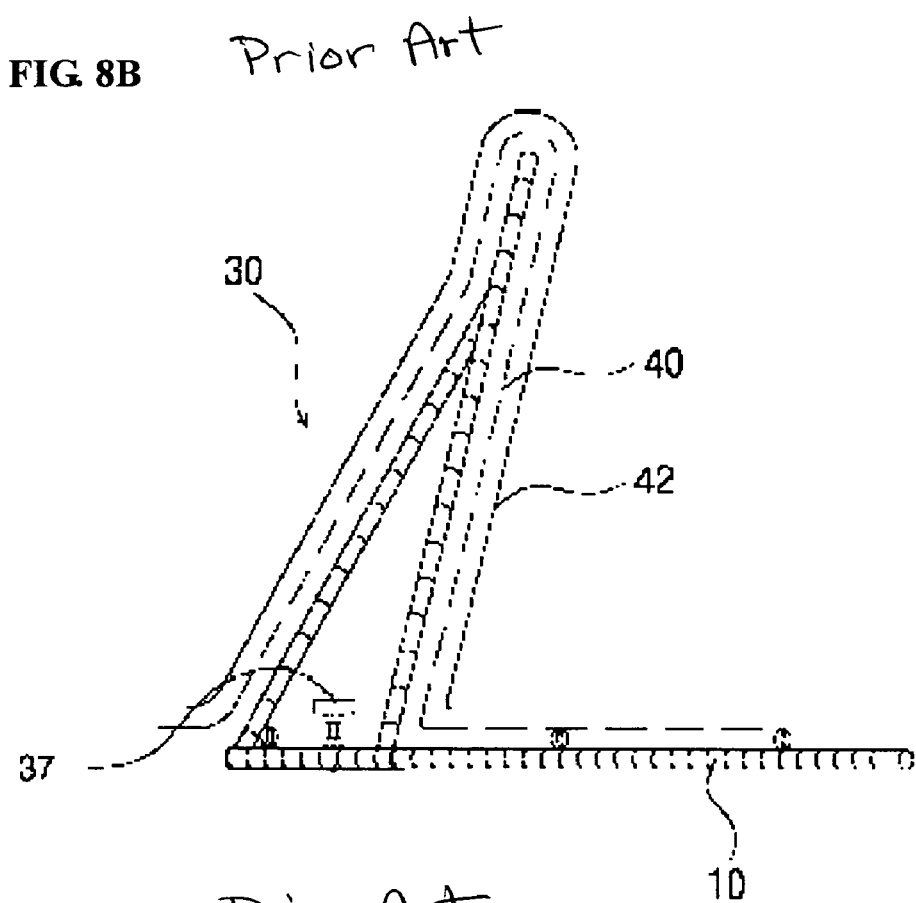
Figure 8C:
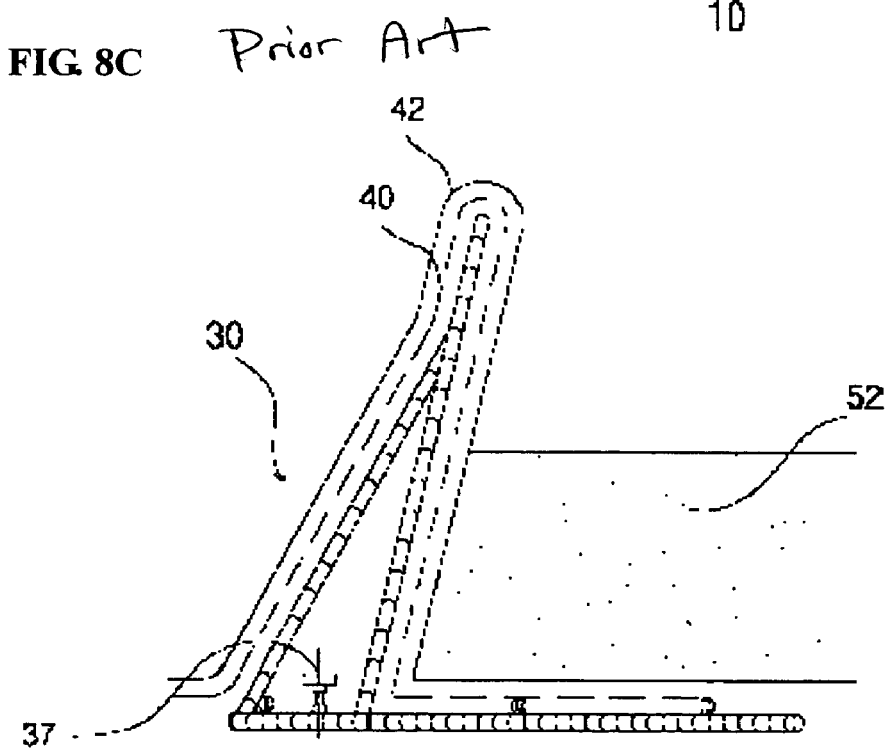
Figure 8D:
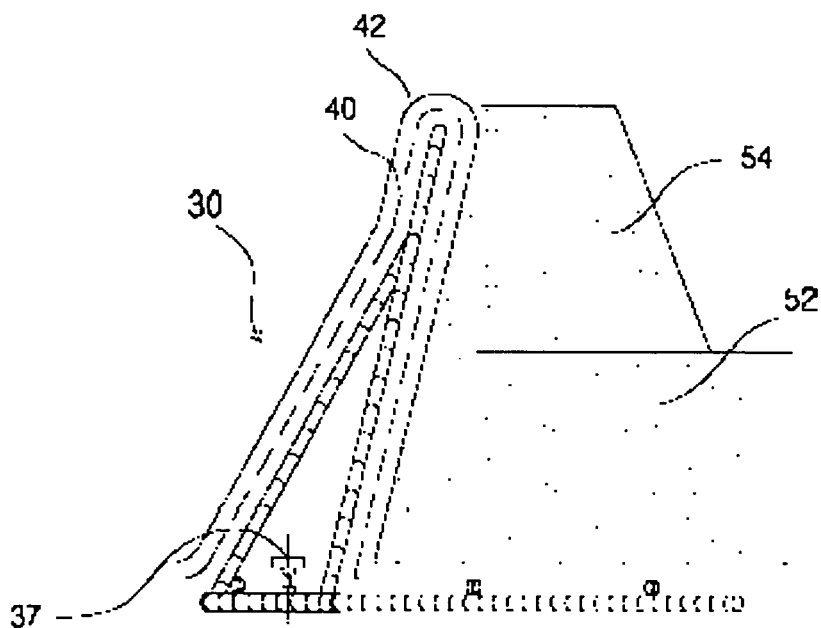
Figure 8E:
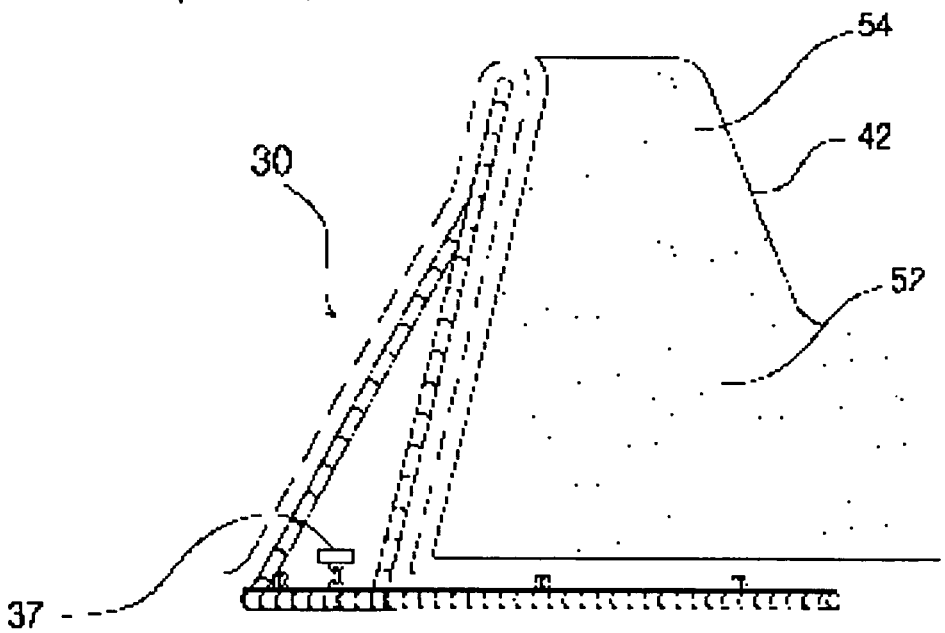
Figure 8F:
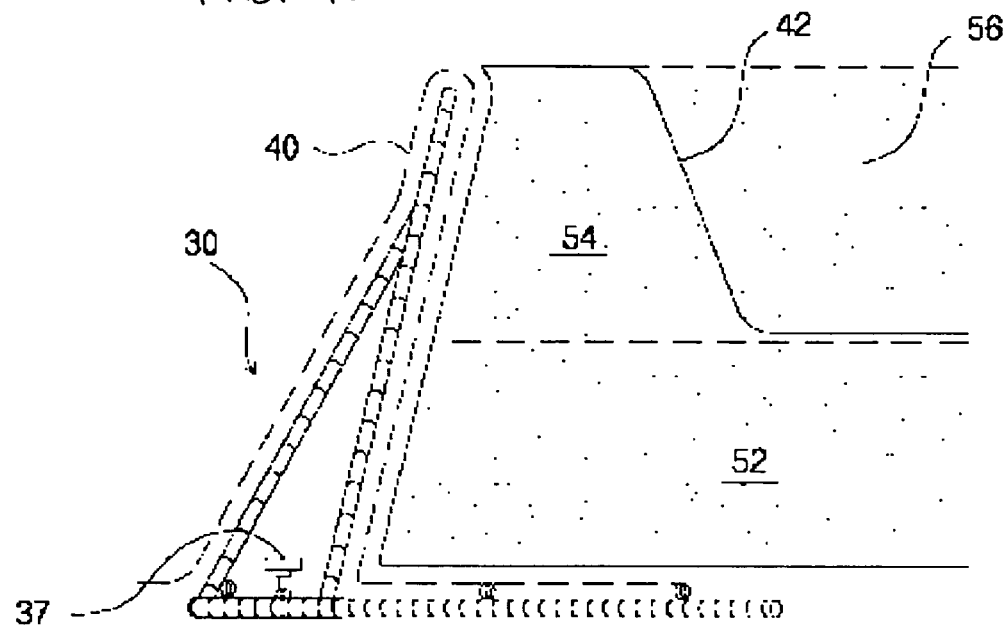
Figure 8G:
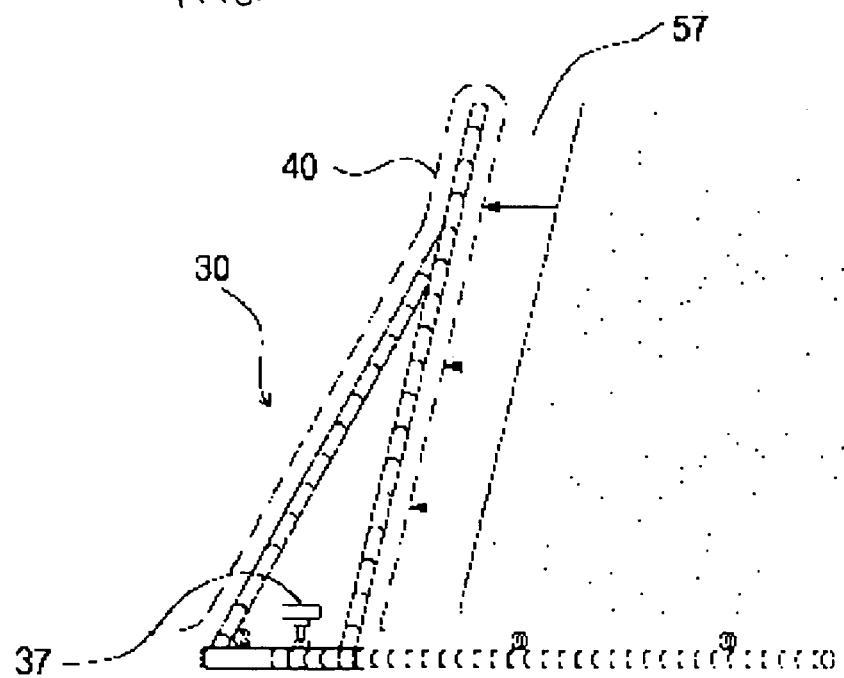
Figure 8H:
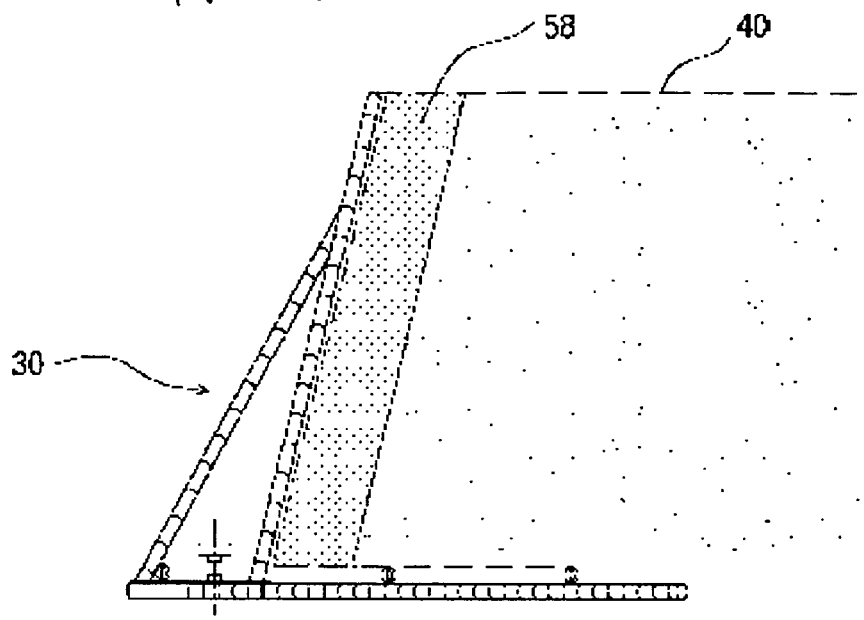
Figure 8I:
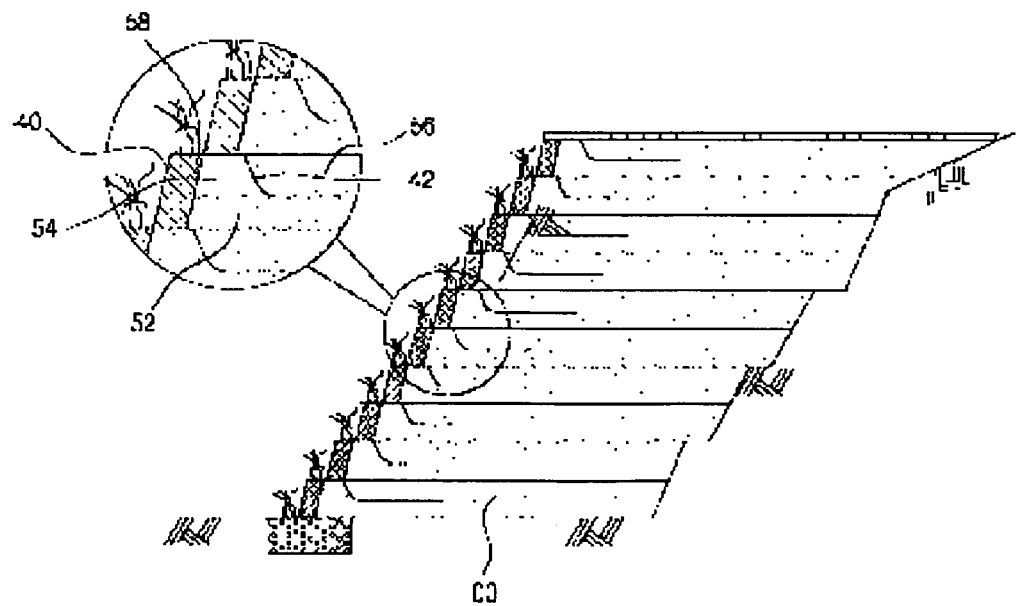

A plurality of the reinforcing geotextile mats 100 and 200 according to the above-described embodiments can be used in a state in which they are coupled to each other as shown in FIG. 7.

As shown in the drawing, by placing the reinforcing geotextile mats 100 and 200 parallel to each other and inserting the first external support members 141 and 241 and the second external support members 142 and 242 through the inclined receiving portions 131 and 231, the vertical receiving portions 132 and 232 and the horizontal receiving portions 133 and 233 of the respective reinforcing geotextile mats 100 and 200, the plurality of mats 100 and 200 are coupled with one another.

At this time, it is to be noted that the first external support members 141 and 241 may be used in a bent state or may comprise two separate members.

As apparent from the above description, the reinforcing geotextile mat according to the present invention provides advantages in that, since the reinforcing geotextile mat itself has support members capable of supporting backfilled soil, auxiliary support structures such as a retaining wall and so forth are not needed when implementing the embankment.

Also, due to the fact that an inclined support section of the reinforcing geotextile mat is defined with a plurality of openings, it is possible to backfill soil through the openings.

Further, because the reinforcing geotextile mat has a plurality of superposed portions and stitched portions, the reinforcing geotextile mat has increased tensile strength.

Moreover, due to the fact that the reinforcing geotextile mat can be manufactured in large quantities for various sizes in a factory and then can be used through simple assembly work at embankment implementation spots, a construction cost can be significantly reduced.

Furthermore, as a plurality of reinforcing geotextile mats can be used in a state in which they are connected to one another, the reinforcing geotextile mat can be freely used irrespective of the scale of an embankment implementation spot.

In addition, the embankment method according to the present invention which uses the above-described reinforcing geotextile mat provides advantages in that, since it is possible to stack another reinforcing geotextile mat on an embankment layer in a state in which backfilled soil of the embankment layer has not completely hardened, a construction period can be remarkably shortened.

Although preferred embodiments of the present invention have been described for illustrative purposes, those skilled in the art will appreciate that various modifications, additions and substitutions are possible, without departing from the scope and spirit of the invention as disclosed in the accompanying claims.

What is claimed is:

1. A reinforcing geotextile mat, the mat comprising:
    support means for supporting a predetermined amount of embankment soil, the support means having a portion being embedded in backfilled soil and arranged at one end of the mat; and
    an accommodating section for accommodating a fixing member, the accommodating section having entire portion thereof embedded in the embankment soil, and arranged at the other end of the mat, wherein
    the support means includes:
    a horizontal supporting section for supporting the backfilled soil in a vertical direction, the section having a horizontal receiving portion;
    a vertical supporting section for supporting the backfilled soil in a horizontal direction, the section having a vertical receiving portion; and
    an inclined supporting section having an opening formed thereon through which the backfilled soil passes and being slantingly embedded in the backfilled soil, the section having a slanting receiving portion, wherein external support members for reinforcing a supporting force are inserted into the horizontal receiving portion, the vertical receiving portion and the slanting receiving portion, respectively.

2. An embankment method using the reinforcing geotextile mat set forth in claim 1, the method comprising the steps of:
   (a) positioning the reinforcing geotextile mat on the ground or hardened embankment soil in a deployed state;
   (b) inserting the external support members in the horizontal receiving portion, the vertical receiving portion and the slanting receiving portion of the reinforcing geotextile mat; and
   (c) backfilling the horizontal supporting section, the vertical supporting section and the inclined supporting section of the reinforcing geotextile mat with soil, and then placing and hardening embankment soil on the reinforcing geotextile mat so that the embankment soil has a predetermined height, wherein steps (a), (b) and (c) are implemented one or more times.

3. The embankment method according to claim 2, wherein step (b) further comprises the step of inserting the external support members into a horizontal receiving portion, a vertical receiving portion and a slanting receiving portion of a plurality of reinforcing geotextile mats to laterally couple one reinforcing geotextile mat to one another.

4. The embankment method according to claim 2, wherein step (c) further comprises the step of installing a drainpipe defined with a plurality of through-holes, adjacent to the supporting sections of the reinforcing geotextile mat.

* * * * *